United States Patent
Zhu et al.

(10) Patent No.: US 8,586,259 B2
(45) Date of Patent: Nov. 19, 2013

(54) PROTON EXCHANGE MEMBRANES BASED ON HETEROCYCLES AND ACIDS THROUGH AN ORGANIC-INORGANIC HYBRID PROCESS

(75) Inventors: Xiaobing Zhu, Atlanta, GA (US); Zhen Zhou, Atlanta, GA (US); Meilin Liu, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 989 days.

(21) Appl. No.: 12/128,610

(22) Filed: May 29, 2008

(65) Prior Publication Data
US 2009/0297910 A1    Dec. 3, 2009

(51) Int. Cl.
*H01M 8/10*    (2006.01)
*C08G 77/04*   (2006.01)

(52) U.S. Cl.
USPC .............................. 429/483; 528/34; 528/25

(58) Field of Classification Search
None
See application file for complete search history.

(56) References Cited

U.S. PATENT DOCUMENTS

| | | | |
|---|---|---|---|
| 5,654,109 A * | 8/1997 | Plowman et al. | 429/494 |
| 6,608,129 B1 * | 8/2003 | Koloski et al. | 524/403 |
| 2004/0146766 A1 | 7/2004 | Li et al. | |
| 2007/0099035 A1 * | 5/2007 | Li et al. | 429/12 |
| 2007/0131611 A1 | 6/2007 | Peng et al. | |

FOREIGN PATENT DOCUMENTS

| | | |
|---|---|---|
| EP | 0718903 A1 | 6/1996 |
| EP | 1463140 A2 | 9/2004 |
| JP | H08-329962 A | 12/1996 |
| JP | 2004-307814 A | 11/2004 |
| JP | 2007-504637 A | 3/2007 |
| WO | 2004107477 A2 | 12/2004 |

OTHER PUBLICATIONS

A new water-free proton conducting membrane for high-temperature application; Sang-Young Lee, Gunter Scharfenberger, Wolfgnag H. Meyer, Gerhard Wegner; Journal of Power Sources 163 (2006); p. 27-33.*

Office Action in co-pending Japanese Application No. 2009-130550 mailed Jul. 30, 2013 in 4 pages.

* cited by examiner

*Primary Examiner* — Patrick Ryan
*Assistant Examiner* — Jose Colucci Rios
(74) *Attorney, Agent, or Firm* — Christopher G. Darrow; Young Basile Hanlon & MacFarlane P.C.

(57) ABSTRACT

Polymer electrolyte membranes (PEMs), methods and use thereof in fuel cells and methods of preparing thereof are disclosed. A PEM may include at least one porous support film and a polysiloxane polymer bonded to the at least one porous support film, wherein the polysiloxane polymer includes at least one polysiloxane grafted to a heterocycle.

20 Claims, 3 Drawing Sheets

PROTON EXCHANGE MEMBRANES BASED ON HETEROCYCLES AND ACIDS THROUGH AN ORGANIC-INORGANIC HYBRID PROCESS

TECHNICAL FIELD

The present disclosure relates generally to polymer electrolyte membranes (PEMS) and in particular to methods of preparing and use thereof in fuel cells.

BACKGROUND

Fuel cells, by the use of electrochemical reactions, serve as an energy source for mobile or stationary applications. They may offer lower emissions, higher energy and lower levels of noise and vibration as compared to alternative energy sources. A fuel cell may typically include a negative electrode (e.g., anode), a positive electrode (e.g., cathode) and a membrane between the anode and cathode.

While various membranes may be employed in the development of fuel cells, polymer electrolyte membranes or proton exchange membranes (PEMs) are currently important components of fuel cells. For example, high temperature (HT) PEMs which are operational at temperatures above 120° C. with no or low humidification, may exhibit beneficial properties such as anode tolerance to significant quantities of carbon monoxide poisoning, enhanced electrode kinetics, reduced cathode flooding, and efficient thermal management.

There are limitations, however, to the existing membranes used in fuel cells and their methods of production. For example, polymer proton conductors including perfluorosulfonic polymers such as Nafion®, which are widely used as a standard materials in low temperature PEM (e.g., perfluorosulfonic acid (PFSA) membrane, sulfonated PEM) fuel stacks due to their proton conductivity and stability, may be difficult to synthesize. The capital costs thus associated with producing some low temperature PEMs still remain high. Also, sulfonated PEMs may depend strongly on the amount of water the membranes contain and the temperature of exposure. Furthermore, membranes having free phosphoric acid ($H_3PO_4$) may exhibit acid leaching, thus resulting in decreased proton conductivity.

Therefore, a need exists to develop mechanically and thermally stable polymer electrolyte membranes exhibiting low acid leaching and high proton conductivity at high temperatures and low relative humidity.

SUMMARY

The following presents a general summary of several aspects of the disclosure in order to provide a basic understanding of the disclosure. This summary is not an exhaustive overview nor is it intended to identify key or critical elements of the disclosure or to delineate the scope of the claims. The following summary merely presents some concepts of the disclosure in a general form as a prelude to the more detailed description that follows.

One aspect of the disclosure provides a proton exchange membrane (PEM) including at least one porous support film and a polysiloxane polymer bonded to the at least one porous support film, wherein the polysiloxane polymer includes at least one polysiloxane grafted to a heterocycle.

Another aspect of the disclosure provides a fuel cell which includes a proton exchange membrane (PEM) including at least one porous support film and a polysiloxane polymer bonded to the at least one porous support film, wherein the polysiloxane polymer includes at least one polysiloxane grafted to a heterocycle.

Yet another illustrative aspect of the disclosure provides a method of preparing a proton electrolyte membrane (PEM) wherein the method includes the steps of contacting at least one porous support film with a mixture of a polysiloxane polymer, wherein the polysiloxane polymer includes at least one polysiloxane grafted to a heterocycle.

BRIEF DESCRIPTION OF DRAWINGS

For a detailed understanding of the present disclosure, references should be made to the following detailed description of the several aspects and/or embodiments, taken in conjunction with the accompanying drawings, in which like elements have been given like numerals and wherein.

DETAILED DESCRIPTION

Before the present compositions and methods are described, it is to be understood that this disclosure is not limited to the particular compositions or methods described, as such compositions and methods may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a membrane" refers to one or several membranes, and reference to "a method of forming" includes reference to equivalent steps and methods known to those skilled in the art, and so forth.

The present disclosure includes embodiments, implementations and/or aspects that relate to polymer electrolyte membranes or proton exchange membranes (PEMs), methods of use thereof, methods of preparing thereof, and fuel cell systems utilizing the PEMs or membranes. The membranes described herein may be used in ion-exchange membranes, extractions of a predetermined fluid component (such as an ion) from a fluid, acid catalysts in a chemical processing system, other ion conducting applications, selective ion-transmitting membranes and the like. Other possible applications of PEMs described herein include, but are not limited to, hydrogen separation, hydrogen purification, reforming or partial oxidation of hydrocarbon fuels, contaminant removal, gas sensing, and other electrochemical systems or processes relevant to energy storage and conversion.

Aspects of PEMS may include high stability (e.g., thermal, mechanical, chemical, electrochemical), high proton conductivity and mechanical flexibility, high durability, operational flexibility and low cost of production. Furthermore, PEMs are adapted to operate under no or low relative humidity (RH) (e.g., 0% to 25% relative humidity) and as a result, fuel cell systems which utilize the PEMs can operate at relatively high temperatures (e.g., above 100° C.), which may result in lower carbon monoxide poisoning.

A PEM as described herein may have a proton conductivity of at least $1 \times 10^{-3}$ S/cm at a temperature range of at least 100° C. and a relative humidity (RH) of about 0% to 100%. In another class of embodiments, the PEM may have a proton conductivity from $1 \times 10-3$ to $1 \times 10^{-1}$ S/cm at a temperature of at least 100° C. and a RH of about 0% to 25%.

In addition, the PEMs as described herein may have $H_2$ and $O_2$ permeability of below $1 \times 10^{-12}$ and $1 \times 10^{-11}$ mol cm$^{-1}$ kPa$^{-1}$, as determined separately.

The dimensions of PEMs may be determined by the configuration of the fuel cell, as is well known in the art. The disclosure contemplates that the thickness and/or radius of the PEM could vary, depending on the application in which the PEM is to be used. For example, the PEMs can have a thickness of less than 50 micrometers (μm).

Furthermore, the PEMs are thermally stable at temperatures of at least 100° C. and at least 120° C., as determined separately. The PEMs are mechanically stable while mechanically flexible. For example, they do not tear or become deformed under normal operating conditions.

Other polymers, for example in the form of fibers, webs, sheets, and the like, can be included within a PEM for improvement of mechanical properties, as well as for other purposes. Thermally stable materials can be introduced into the matrix to make a material less brittle, such as a polymer, glass, ceramic, or other material, in the form of a grid, sheet, fiber, web, ring, branching structure, spiral, undulating form, or other form, and the like.

Basic polymers which may be added to reduce brittleness, and possibly increase conductivity, include fluorosulfonate ionomers such as Nafion®, other ionomers, other polyelectrolytes, other fluoropolymers such as poly(vinylidene fluoride) or Teflon®, plasticizers, other thermopolymers, polymers having nitrogen-containing heterocycles (such as polybenzimidazole or PBI), polyacryamide, other polyamides, other polyimides, derivatives or combinations of the aforementioned polymers, or other basic polymers. Phosphoric acid (PA) doped PBI-based membrane or PBI-$H_3PO_4$ system, an acid-based polymer membrane, may provide improved mechanical stability and greater dimensional stability over conventional membranes. However, because the free or mobile acid (e.g., $H_3PO_4$) may leach from the PA doped PBI-based membrane in the presence of liquid water, flooding and corrosion of the electrodes and thus decreased proton conductivity may result.

The PEMs disclosed herein may comprise components which may reduce the occurrence of acid leaching from the membranes and improve proton conductivity of the membranes. Components of the PEMs may include (as discussed in more detail below), but are not limited to, a porous support film and a polysiloxane polymer comprising at least one polysiloxane grafted to a heterocycle whereby the polysiloxane polymer is doped with free acid (e.g., $H_3PO_4$).

A PEM may include at least one porous support film including, but not limited to expanded polytetrafluoroethylene or polytetrafluorothene (ePTFE) material. ePTFE may be a support film possessing hydrophobic properties, low surface energy, and inert characteristics.

Polymerized around the fibers of the porous support film may be polysiloxanes having a backbone of silicon atoms (Si), oxygen atoms (O), and organic chains, thus forming an interpenetrated organic-inorganic hybrid matrix. In some embodiments, a PEM comprises a polymer with an organic-inorganic hybrid matrix, including silicon atoms, oxygen atoms, organic chains, a polysiloxane and an acid functional group chemically bonded (e.g., hydrogen bonded) to the organic-inorganic matrix.

A class of embodiments of PEMs may include heterocycles chemically linked (e.g., grafted) to the polysiloxane (to be described below). In other embodiments, heterocycles may be doped by absorption into the organic-inorganic hybrid matrix. Thus, heterocycles may be free to move within the organic-inorganic hybrid matrix. The heterocycles may include, for example, imidazole, pyrrozole, imidazole-containing compounds, pyrozole compounds or derivatives thereof.

A polysiloxane polymer linked to a heterocycle may be referred to herein as a base-grafted polysiloxane. In such embodiments, the base-grafted polysiloxanes may comprise at least one backbone unit having a formula [—$O_b$—Si—($R^1$)$_b$(CH$_2$)$_n$W)—], wherein b is a first integer from 0 to 3, n is a second integer from 1 to 20, $R^1$ is a $C_1$ to $C_{20}$ hydrocarbon, and W may include a nitrogen-containing heterocycle such as 1H-1,2,3-triazole, 1H-1,2,4-triazole, H-benzimidazole and the like. It is understood that a base-grafted polysiloxane may also comprise at least one backbone unit having a formula [=($O_2$)Si—($R^1$)(CH$_2$)$_n$W)—] or [=($O_3$)Si—(CH$_2$)$_n$W)—]. The nitrogen-containing heterocycles may enhance proton conductivity by providing at least one lone pair of electrons to the organic-inorganic hybrid matrix. For purposes of illustration only, exemplary structures of base-grafted polysiloxanes including 1,2,4-triazole-grafted polysiloxane, benzimidazole-grafted polysiloxane and 1,2,3-triazole-grafted polysiloxane are illustrated, respectively, by Structures B1-B4 below.

STRUCTURE B1

STRUCTURE B2

-continued

STRUCTURE B3

STRUCTURE B4

In another class of embodiments, the PEMs may include acid-grafted polysiloxane compounds integrated into the porous support film. The acid-grafted polysiloxane compounds can include, but are not limited to, acid functional groups such as phosphorus-containing acid groups (including phosphonic acid group, —$PO_3H_2$, or equivalently, phosphoryl group), sulfur-containing acid groups (such as a sulfonic acid group, —$SO_3H$) and boron-containing acid groups (such as boronic acid group, —$B(OH)_2$). In addition to phosphonic and/or sulfonic acid, precursor compounds thereof such as salts may be doped by absorption into the organic-inorganic hybrid matrix or chemically linked to the polysiloxane backbone unit. For purposes of illustration, one possible structure of an acid-grafted polysiloxane such as phosphonic acid-grafted polysiloxane is shown below as Structure C.

STRUCTURE C

Two or more different acid groups may be provided, linked to a organic-inorganic hybrid matrix by, for example, first and second linking groups, which themselves may be the same or different. In other examples, one or more species of acid group and one or more species of proton solvent groups (such as a nitrogen-containing heterocycle), can both be bound to the organic-inorganic hybrid matrix. Acid functional groups containing silicon compounds may further include a functional group, such as a polymerizable group, and/or a group allowing grafting to an organic polymer chain.

A crosslinking group chemically linking at least one polysiloxane and forming the organic-inorganic hybrid matrix can be an organic group such as a hydrocarbon (e.g., alkyl) chain. The crosslinking group can be, for example, an aliphatic hydrocarbon group having 2 to 20 carbon atoms, such as an alkyl or alkene, a phenyl group or derivative, or a methacryl (or acryl) containing aliphatic group. The crosslinking group may be substituted with or otherwise include, for example, one or more O, N, S, or halogen (e.g., F, Cl, Br,) atoms. The introduction of multiple crosslinking groups may increase the mechanical strength of the PEM by increasing the degree of crosslinking of the polysiloxane within the organic-inorganic hybrid matrix.

Possible crosslinking groups may include, but are not limited to, tetraethoxysilane (TEOS), tetramethoxysilane (TMS), $SiO_4$ and backbone units having a formula $[R^{3'}R^{2'}R^{1'}$—Si—X—Si—$R^1R^2R^3]$ wherein each of $R^1$, $R^2$, $R^3$, $R^{1'}$, $R^{2'}$, $R^{3'}$ and X are substituent groups which may include hydrocarbons such as, but not limited to, a linear $C_1$ to $C_{20}$ hydrocarbon, a branched $C_1$ to $C_{20}$ hydrocarbon, a halogen-substituted linear $C_1$ to $C_{20}$ hydrocarbon, and a halogen-substituted branched $C_1$ to $C_{20}$ hydrocarbon. In other possible embodiments, $R^1$, $R^2$, $R^3$, $R^{1'}$, $R^{2'}$, $R^{3'}$ and X may each comprise ether groups such as, but not limited to, methoxy (—$OCH_3$ or —OMe) and ethoxy (—$OCH_2CH_3$ or —OEt). In yet other possible embodiments, $R^1$, $R^2$, $R^3$, $R^{1'}$, $R^{2'}$, $R^{3'}$ and X may each be substituted by one, two or three oxygen atoms. Exemplary structures of crosslinker compounds with units represented by $[R^{3'}R^{2'}R^{1'}$—Si—$(CH_2)_n$—Si—$R^1R^2R^3]$ are illustrated by Structures A1 and A2.

STRUCTURE A1

STRUCTURE A2

The conductivity of membranes can be improved by including one or more species of free acid molecules in addition to any acid groups bound to the matrix. In the case of heterocycle or base-grafted polysiloxanes which may act as weak bases, the free acids may interact with the bases to promote hydrogen transport through the membrane, thus increasing proton conductivity. Example free acids include phosphoric acid ($H_3PO_4$), sulfuric acid ($H_2SO_4$), carboxylic acid, superacids, suitable organic and inorganic acids and the like. The free acid groups may also include acid salts which may be readily converted to an acid group and ionized forms of acid groups. Free acids may be doped by absorption into the organic-inorganic hybrid matrix and thus are free to move within the matrix.

The embodiments of PEMs discussed herein can be fabricated by various methods. Single-layer PEMs may be synthesized by sol-gel process (discussed below), spraying methods or similar methods. Prior to forming the flexible proton electrolyte membrane, components including at least one hybrid organic-inorganic copolymer network former compound including an inorganic acid functional group, the Si—O inorganic backbone former compound, polysiloxanes, crosslinker precursor and diluted acid catalyst are mixed. It is contemplated that the polysiloxane employed in the membrane could be one of base-grafted (e.g., imidazole, triazole, benzimidazole), acid-grafted (phosphonic acid), or acid-grafted combined with base-grafted. Furthermore, diluted acid catalysts previously mentioned may include aqueous HCl, $H_3PO_4$, $H_2SO_4$, a combination thereof or other suitable acid catalyst. A single-layer PEM may be produced by a first method wherein membrane formation occurs following the addition of the components to ePTFE support film. An expanded polytetrafluoroethylene or polytetrafluorothene (PTFE) hydrophobic porous support film serves as a supporting material in the formation of PEMs in the present disclosure.

Free acid (e.g., $H_3PO_4$, $H_2SO_4$) is subsequently doped into the membrane or added to the membrane to form a single-layer PEM. Alternatively, the single-layer PEM may be produced by a second method in which free acid and alcohol solution is added following the addition of the components to ePTFE film. Furthermore, the single-layer PEM can be obtained by another method which includes spraying the acid or base-grafted polysiloxane solution on the porous ePTFE film, then drying to form the membrane.

Due to the presence of organosiloxane components such as TEOS and crosslinking groups during membrane formation, the sol-gel process of hydrolysis, condensation, polycondensation, gelation, aging, drying, and dehydration may occur on the surface of PTFE nanorods and nodes or pores of ePTFE film. The above-mentioned composite membrane may exhibit mechanical and chemical stability due to in-situ polymerization of organosiloxane crosslinking groups/precursors and polysiloxanes occurring in the pores of porous ePTFE and growing along the rods and nodes of ePTFE film.

As described in the Examples below, the processes of laminating, co-casting or hot-pressing several single-layer membranes may be employed to increase densification of single-layer membranes or to produce multi-layer membranes (e.g., tri-layer membranes).

Figure 1:
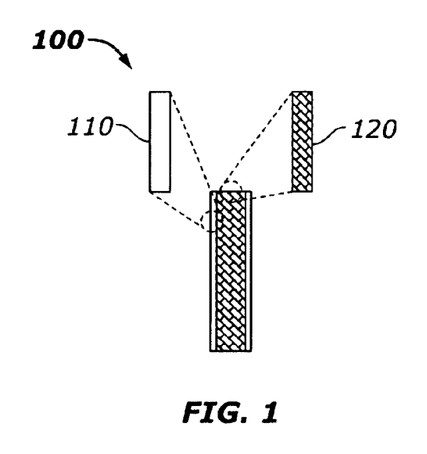
FIG. 1 represents a schematic diagram of a tri-layer hybrid organic-inorganic membrane.

Now referring to FIG. 1 is a schematic diagram of a tri-layer membrane (e.g., hybrid organic-inorganic) indicated generally at 100. As to be described in greater detail below, the tri-layer membrane may be formed from a hot-press process involving a two-skin layer 110 or bi-layer and a single central layer 120.

Figure 2:
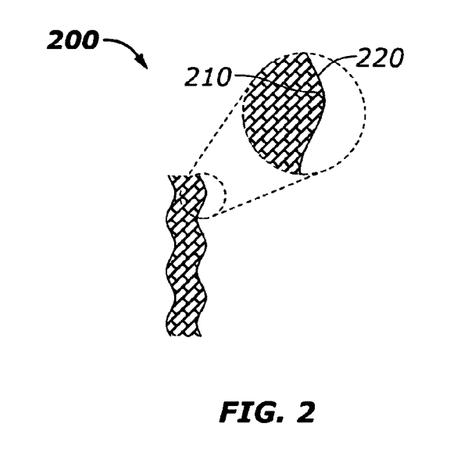
FIG. 2 represents a schematic diagram of a close-up of a tri-layer hybrid organic-inorganic membrane.

Continuing with FIG. 2 is shown a close-up view of the tri-layer membrane of FIG. 1 indicated generally at 200. The tri-layer membrane 100 shown is shown with a skin layer 220 which may comprise a heterocycle grafted polysiloxane 210 and phosphonic acid-grafted polysiloxane 220. The skin layer 220 of the tri-layer membrane 100 may provide a like-charge affect to prevent the leaching of free acid (e.g., $H_3PO_4$) from the membrane.

Now having described PEMs, methods of use thereof, methods of preparing thereof, and fuel cell systems using the membranes in general, the following describe possible embodiments of PEMs. These examples are not intended to limit the scope of any embodiment of this disclosure or claims below, but rather are intended to provide specific exemplary embodiments. Therefore, one skilled in the art would understand that many conditions can be modified to produce a desired result, and it is intended that these modifications be within the scope of the embodiments of this disclosure.

EXAMPLE 1

Synthesis of acid or base-grafted polysiloxane. Heterocycle-grafted polysiloxane, e.g. 1,2,4-triazole-grafted polysiloxane 1H-1,2,4-triazole (6.9 g, 0.1 mol) and dimethoxymethyl-3-chloropropylsilane (18.2 g, 0.1 mol) and KOH (6.8 g, 0.12 mol) were mixed in MeOH 100 mL and the solution was refluxed for three days. After evaporating the solvent, the residue was dissolved in $CH_2Cl_2$ and the solution was washed with water. The organic layer was separated and dried with anhydrous $MgSO_4$ and evaporated to provide 17.1 g oil (~100% yield). $^1H$ NMR ($CDCl_3$, 300 MHz): δ (ppm) 0.2-0.1 (br, $CH_3$—Si), 0.2-0.6 (br, —$CH_2$—Si), 1.6-2.0 (br, —$CH_2$—C—Si), 4.0-4.2 (br, —$CH_2$—N), 7.8-8.4 (br, —CH=N). $^{13}C$ NMR: δ (ppm) 0.27, 14.26, 23.87, 52.14, 143.43, 152.1.

Phosphonic acid-grafted polysiloxane water solution. 15 g commercially available diethyl 3-(diethoxy(methyl)silyl) propylphosphonate was dissolved in 50 mL concentrated HCl solution and refluxed until all the phosphonic ester groups were hydrolyzed. After the solution was concentrated by distillation, water was added and distilled again to remove HCl in the product until precipitates could not be detected by mixing the resulting solution with prepared $AgNO_3$ solution. Calculated amounts of water was added into the resulting solution of poly(dihydroxy(methyl)sillyl) propylphosphonic acid) to achieve a certain concentration.

EXAMPLE 2

Preparation of single-layer membrane and skin layer. 1 g 1,2,4-triazole-grafted polysiloxane from Example 1, 1 g organosiloxane crosslinker of TEOS and Si—$C_8$ (ratio in weight, 1:1) were dissolved in MeOH/EtOH (1:1) to obtain a solution, then 1 ml 0.1 mol/l HCl was added dropwise to the solution and kept stirring for 24 h to obtain solution #1.1 g concentrated $H_3PO_4$ (85 wt. %) was dissolved in 5 mL MeOH, followed by stirring for 24 h to obtain an acid solution. The acid solution was mixed with solution #1 and kept stirring for 0.5 h to obtain solution #2. At the same time, a piece of ePTFE film (thickness of 50 μm, pore size of 0.2-0.5 μm, porosity of 85%) with an area of 15 cm² was framed to make it flat. The solution #2 was cast on the surface of framed ePTFE film, then dried at room temperature for 2 days. Finally, after the membrane formed, the following heat treatment was applied and the membrane was dried at 60° C. for 4 h and 130° C. for half an hour. The single-layer membrane was obtained by the previously mentioned sol-gel method.

The solution #2 from above was sprayed slowly onto the surface of the ePTFE film (thickness of 50 μm, pore size of 0.2-0.5 μm, porosity of 85%) until it was dry, forming the membrane. The heat treatment that followed was the same as described above. The single-layer membrane was thus obtained by a spraying method.

1 g phosphonic acid-grafted polysiloxane from Example 1, 1 g organosiloxane crosslinker of TEOS and Si-C8 (ratio in weight, 1:1) were dissolved in MeOH/EtOH (1:1), then 1 ml 0.1 mol/l HCl was added dropwise to the solution and kept stirring for 24 hr to obtain solution #3. At the same time, a piece of ePTFE film (thickness of 50 μm, pore size of 0.2-0.5 μm, porosity of 85%) with area of 15 cm² was framed to make it flat. The solution #3 was cast on the surface of framed ePTFE film, then dried at room temperature for 2 days. Finally, after the membrane formed, a heat treatment was applied in which the membrane was dried at 60° C. for 4 hr and 130° C. for half an hour. Thus, the skin-layer of the membrane was obtained by the sol-gel method described above.

The solution #3 from above was sprayed slowly on to the surface of the ePTFE film (thickness of 50 μm, pore size of 0.2-0.5 μm, porosity of 85%) until the film dried and the membrane was formed. The heat treatment that followed was the same as that described above and a skin-layer was obtained by the forementioned spraying method.

EXAMPLE 3

Preparation of bi-layer membrane and tri-layer membrane. Two pieces of single-layer membrane from Example 2 were laminated at 200° C. and 4 psi for 5 minutes to obtain a bi-layer membrane. A two-skin layer or bi-layer from Example 2, and one single-layer membrane from Example 2 were hot-pressed at 200° C. and 4 psi for 5 minutes to obtain a tri-layer membrane.

Solution #3 from Example 2 was sprayed on the two surface sides of single-layer membrane from Example 2 and dried to obtain a tri-layer membrane. The single-layer membrane from Example 2 was then immersed in solution #3 for 1 hr. and dried quickly to obtain a tri-layer membrane with a molecular-level skin layer.

EXAMPLE 4

Preparation of modified Nafion®-electrode for PEM fuel cell evaluation. 40 µL 500 mg/l $H_3PO_4$ in water was dropped on the catalyst layer of 1 $cm^2$ Nafion®-electrode (Pt loading, 0.5 mg/$cm^2$), and dried quickly at 100° C. vacuum oven for half an hour. The acid loading in electrode was 20 mg/$cm^2$.

EXAMPLE 5

Figure 3:
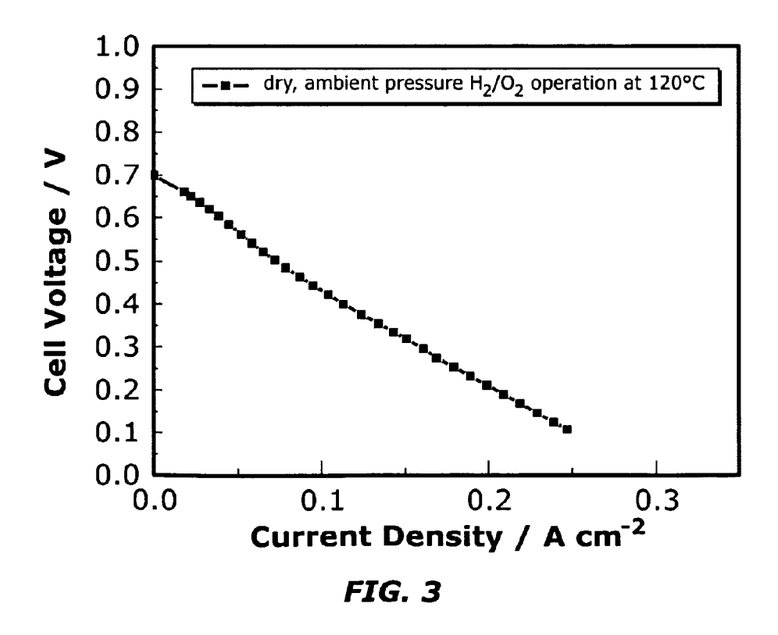
FIG. 3 represents a graph of cell voltages and current density for single-layer hybrid organic-inorganic membranes.

Fuel cell evaluation. Shown in FIG. 3 is a polarization curve indicating cell voltage as a function of current density of a fuel cell employing a single-layer membrane confirmed by impedance spectroscopy. The fuel cell was operated at 120° C. with 4 N-m torque applied, with the ambient pressure of $H_2$ and $O_2$ at flow rate of 10 mL/min. The fuel cell components included the single-layer membrane from Example 2 and the modified Nafion®-electrode from Example 4. The polarization curve illustrates the drop from cell voltage as a result of a drawing electric current and thus is an indication of fuel cell performance and stability.

EXAMPLE 6

Figure 4:
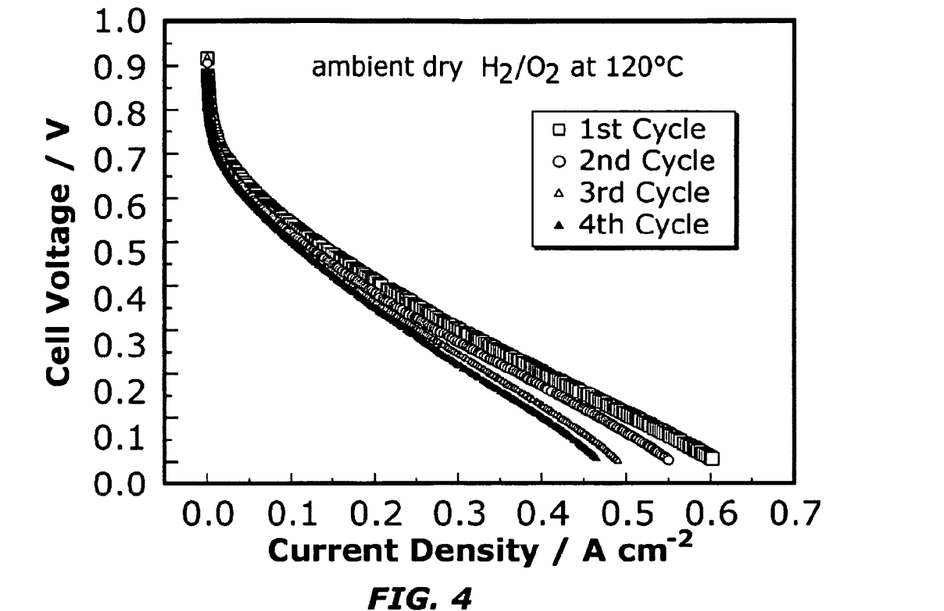
FIG. 4 represents a graph of cell voltages and current density for bi-layer hybrid organic-inorganic membranes.

Now referring to FIG. 4 is a polarization curve indicating cell voltage as a function of current density of a fuel cell employing a bi-layer membrane confirmed by impedance spectroscopy. The fuel cell evaluation conditions are the same as for the single-layer membrane described above. Each cycle duration measures 2 hrs and 5 times short-circuit discharging. The polarization curve in FIG. 4 serves as an indication of performance and stability over four cycles of a fuel cell employing a bi-layer membrane. As shown by the curve, the performance of the fuel cell is slightly reduced after each cycle.

EXAMPLE 7

Figure 5:
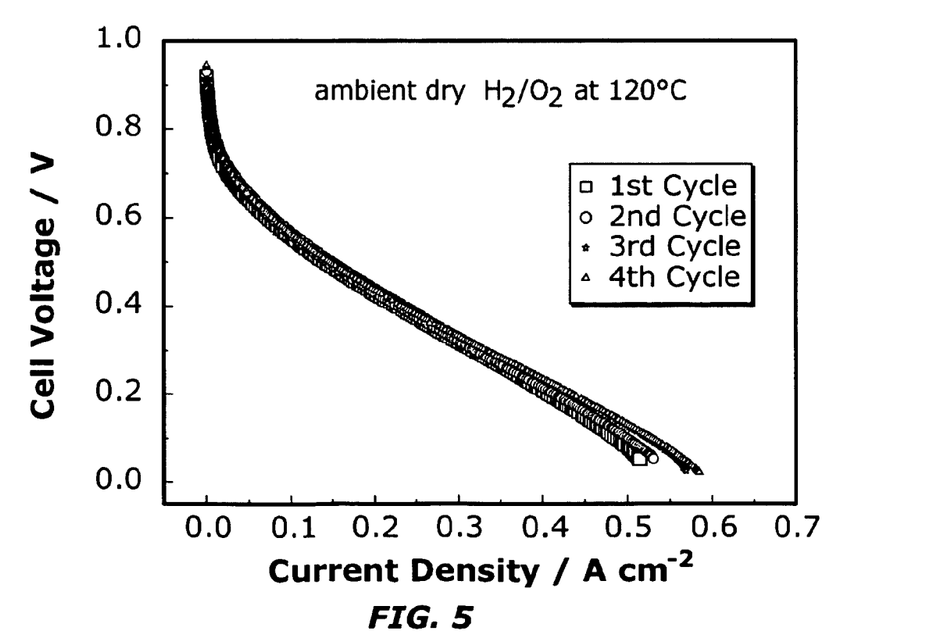
FIG. 5 represents a graph of cell voltages and current density for tri-layer hybrid organic-inorganic membranes.

As shown in FIG. 5, a polarization curve indicating cell voltage as a function of current density of a fuel cell employing a tri-layer membrane is confirmed by impedance spectroscopy. The fuel cell evaluation conditions are the same as for the single-layer and bi-layer membranes described above. The polarization curve in FIG. 5 serves as an indication of performance and stability over four cycles of a fuel cell employing a tri-layer membrane. In comparing FIG. 4 to FIG. 5, the performance and/or stability of a fuel cell employing a tri-layer membrane does not exhibit as significant a drop as one employing a bi-layer membrane over the duration of 4 cycles.

EXAMPLE 8

Figure 6:
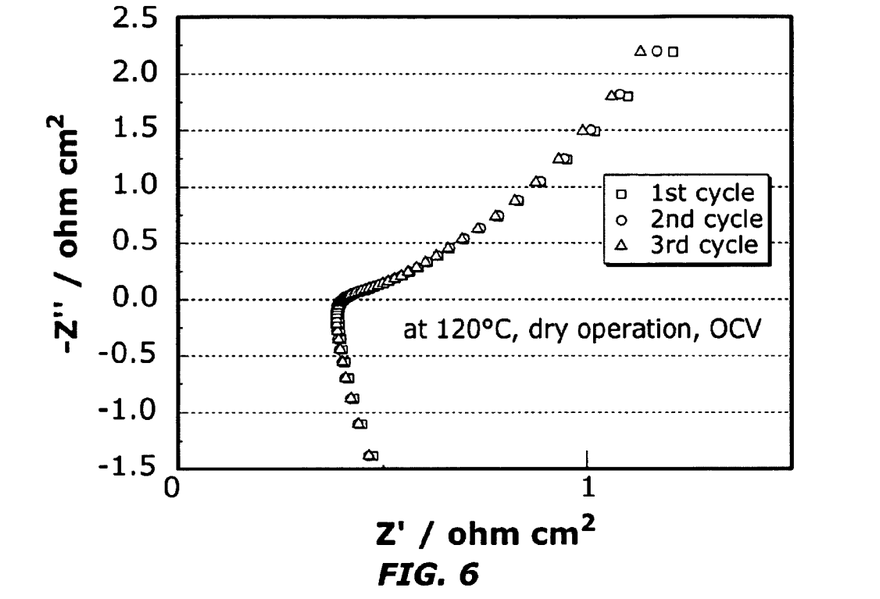
FIG. 6 represents a graph of impedance values for tri-layer hybrid organic-inorganic membranes using impedance spectroscopy.

FIG. 6 provides impedance spectroscopy of a single fuel cell employing a tri-layer membrane operated at 120° C. with ambient dry $H_2/O_2$ during three different cycles measured at 0CV. Each cycle duration measures 2 hrs and 5 times short-circuit discharging.

The fuel cell evaluation conditions were the same as in Examples 5-7 except the tri-layer membrane from Example 7 and home-made electrode (1 $cm^2$, Pt loading, anode and cathode of 0.5 and 1.0 mg/$cm^2$, and $H_3PO_4$ acid doping of 20 mg/$cm^2$) were utilized.

EXAMPLE 9

Figure 7:
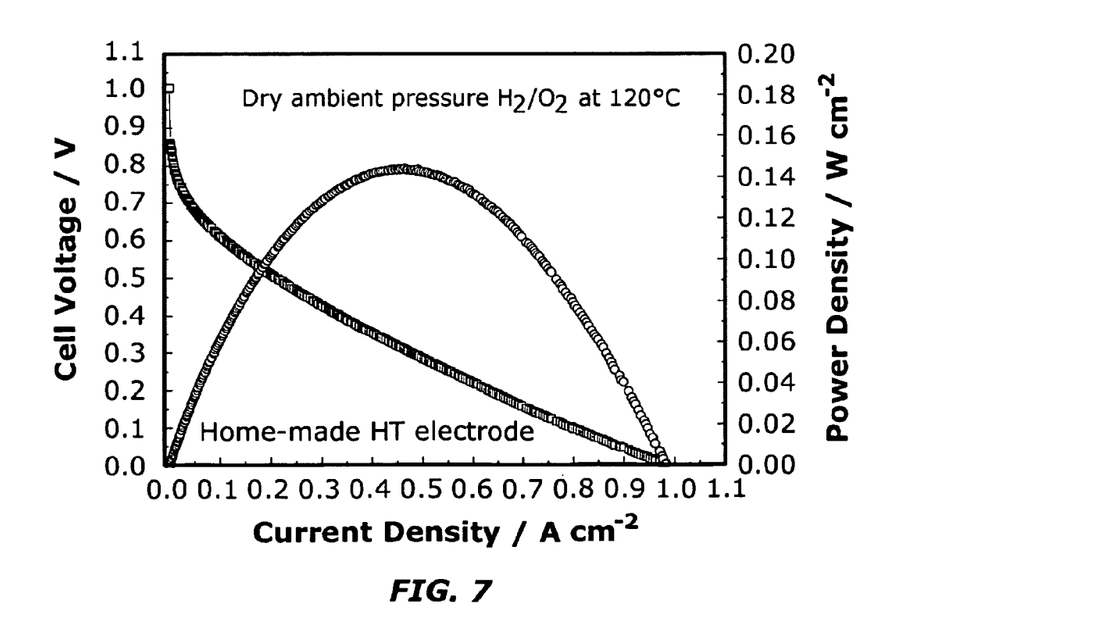
FIG. 7 represents a graph of cell voltages, current density and power density for tri-layer hybrid organic-inorganic membranes.

Now referring to FIG. 7 is a polarization curve indicating cell voltage and power density as functions of current density of a single fuel cell employing a tri-layer membrane and home-made electrode operated at 120° C. and dry ambient pressure $H_2/O_2$ membrane confirmed by impedance spectroscopy. The fuel cell evaluation conditions were the same as in Example 8. The peak power density reached was 0.15 W/$cm^2$, at dry and ambient pressure $H_2/O_2$ operation, comparable to or slightly better than that of commercial PBI-$H_3PO_4$ systems based on the same gases operation pressure and temperature range of 120-150° C., although the free $H_3PO_4$ acid level of the tri-layer membrane was almost only 10% of a PBI-$H_3PO_4$ system.

It should be emphasized that the above-described embodiments and/or examples of this disclosure are set forth merely for the purpose of providing an understanding of the principles of this disclosure. Thus, the disclosure is not restricted to the illustrative embodiments and/or examples described above and as such, the embodiments and/or examples are not intended to be limitations on the scope of the disclosure. Many variations and modifications may be made to the above-described embodiments and/or examples of this disclosure without departing substantially from the spirit and principles of this disclosure. All such modifications and variations are intended to be included herein within the scope of this disclosure and protected by the following claims.

What is claimed is:

1. A proton exchange membrane (PEM) comprising:
at least one porous support film, wherein the at least one porous support film comprises expanded polytetrafluoroethylene (ePTFE), the porous support film having fibers; and a layer of free acid having two sides; and a polysiloxane polymer polymerized around the fibers in the at least one porous support film, the polysiloxane polymer in contact with both sides of the layer of free acid resulting in a tri-layer PEM, wherein the polysiloxane polymer comprises at least one polysiloxane grafted to a heterocycle.

2. The membrane of claim 1, wherein the at least one polysiloxane comprises at least one backbone unit having a formula [—$O_b$—Si—$(R^1)_b(CH_2)_n$W)—], wherein b is a first integer from 0 to 3, n is a second integer from 1 to 20, $R^1$ is a $C_1$ to $C_{20}$ hydrocarbon, and W is selected from the heterocycle, a phosphonic acid and a sulfonic acid.

3. The membrane of claim 1, wherein the heterocycle is selected from imidazole, 1H-1,2,3-triazole, 1H-1,2,4-triazole and 1 H-benzimidazole.

4. The membrane of claim 1, wherein the polysiloxane polymer is doped with a free acid.

5. The membrane of claim 4, wherein the free acid is selected from phosphoric acid, sulfuric acid, carboxylic acid and a combination thereof.

6. The membrane of claim 1, wherein the crosslinking group is selected from tetraethoxysilane (TEOS), tetramethoxysilane (TMOS), $SiO_4$ and a backbone unit having a formula [R$^{3\prime}$R$^{2\prime}$R$^{1\prime}$—Si—X—Si—R$^1$R$^2$R$^3$], wherein each of R$^1$, R$^2$, R$^3$, R$^{1\prime}$, R$^{2\prime}$,R$^{3\prime}$ and X are hydrocarbon substituent groups.

7. The membrane of claim 6, wherein each of R$^1$, R$^2$, R$^3$, R$^{1\prime}$, R$^{2\prime}$,R$^{3\prime}$ and X is selected from an ether hydrocarbon, a linear C$_1$ to C$_{20}$ hydrocarbon, a branched C$_1$ to C$_{20}$ hydrocarbon, a halogen-substituted linear C$_1$ to C$_{20}$ hydrocarbon, a benzyl hydrocarbon, a halogen-substituted branched C$_1$ to C$_{20}$ hydrocarbon, a single oxygen substituent, a double oxygen substituent, a triple oxygen substituent and a combination thereof.

8. The method of claim 7, wherein the ether hydrocarbon is selected from methoxy and ethoxy.

9. A fuel cell comprising:
   a proton exchange member (PEM) comprising:
      at least one porous support film, the porous support film having fibers; and
      a layer of free acid; and
      a polysiloxne polymer bonded to the at least one porous film, the polysiloxane polymer in contact with both sides of the layer of free acid resulting in a tri-layer PEM, wherein the polysiloxane polymer comprises at least one polysiloxane grafted to a heterocycle, wherein the at least one porous film comprises expanded polytetrafluoroethylene (ePTFE).

10. The membrane of claim 9, wherein the at least one polysiloxane comprises at least one backbone unit having a formula [—O$_b$—Si—(R$^1$)$_b$(CH$_2$)$_n$W—], wherein b is a first integer from 0 to 3, n is a second integer from 1 to 20, R$^1$ is a C$_1$ to C$_{20}$ hydrocarbon, and W is selected from the heterocycle, a phosphonic acid and a sulfonic acid.

11. The membrane of claim 9 wherein the heterocycle is imidazole, 1H-1,2,3-triazole, 1H-1,2,4-triazole and 1 H-benzimidazole.

12. The membrane of claim 9, wherein the polysiloxane polymer is doped with a free acid.

13. The membrane of claim 12, wherein the free acid is selected from phosphoric acid, sulfuric acid, carboxylic acid and a combination thereof.

14. The membrane of claim 9, wherein the crosslinking group is selected from tetraethoxysilane (TEOS), tetramethoxysilane (TMOS), SiO$_4$ and a backbone unit having a formula [R$^{3\prime}$R$^{2\prime}$R$^{1\prime}$—Si—X—Si—R$^1$R$^2$R$^3$], wherein each of R$^1$, R$^2$, R$^3$, R$^{1\prime}$, R$^{2\prime}$,R$^{3\prime}$ and X are hydrocarbon substituent groups.

15. The membrane of claim 14, wherein each of R$^1$, R$^2$, R$^3$, R$^{1\prime}$, R$^{2\prime}$, R$^{2\prime}$,R$^{3\prime}$ and X is selected from an ether hydrocarbon, a linear C$_1$ to C$_{20}$ hydrocarbon, a branched C$_1$ to C$_{20}$ hydrocarbon, a halogen-substituted linear C$_1$ to C$_{20}$ hydrocarbon, a benzyl hydrocarbon, a halogen-substituted branched C$_1$ to C$_{20}$ hydrocarbon, a single oxygen substituent, a double oxygen substituent, a triple oxygen substituent and a combination thereof.

16. The membrane of claim 15, wherein the ether hydrocarbon is selected from methoxy and ethoxy.

17. A method of preparing a proton electrolyte membrane (PEM), the method comprising the steps of:
   contacting at least one porous support film with a mixture of a polysiloxane polymer, the polysiloxane polymer in contact with both sides of the layer of free acid resulting in a tri-layer PEM, wherein the polysiloxane polymer comprises at least one polysiloxane grafted to a heterocycle, wherein the at least one porous support film comprises expanded polytetrafluoroethylene (ePTFE); and
   polymerizing the at least one functionalized siloxane monomer and crosslinker around fibers present in the porous support film.

18. The method of claim 17, wherein the at least one polysiloxane comprises at least one backbone unit having a formula [—O$_b$—Si—(R$^1$)$_b$(CH$_2$)$_n$W—], wherein b is a first integer from 0 to 3, n is a second integer from 1 to 20, R$^1$ is a C$_1$ to C$_{20}$ hydrocarbon, and W is selected from the heterocycle, a phosphonic acid and a sulfonic acid, the heterocycle is selected from imidazole, 1H-1,2,3-triazole, 1H-1,2,4-triazole and 1 H-benzimidazole.

19. The method of claim 17, further comprising doping the polysiloxane polymer with a free acid, wherein the free acid is selected from phosphoric acid, sulfuric acid, carboxylic acid and a combination thereof.

20. The method of claim 17 the at least one polysiloxane is cross linked by a crosslinking group selected from tetraethoxysilane (TEOS), tetramethoxysilane (TMOS), SiO$_4$ and a backbone unit having a formula [R$^{3\prime}$R$^{2\prime}$R$^{1\prime}$—Si—X—Si—R$^1$R$^2$R$^3$], wherein each of R$^1$, R$^2$, R$^3$, R$^{1\prime}$, R$^{2\prime}$,R$^{3\prime}$ and X is selected from an ether hydrocarbon, a linear C$_1$ to C$_{20}$ hydrocarbon, a branched C$_1$ to C$_{20}$ hydrocarbon, a halogen-substituted linear C$_1$ to C$_{20}$ hydrocarbon, a benzyl hydrocarbon, a halogen-substituted branched C$_1$ to C$_{20}$ hydrocarbon, a single oxygen substituent, a double oxygen substituent, a triple oxygen substituent and a combination thereof.

\* \* \* \* \*

UNITED STATES PATENT AND TRADEMARK OFFICE
CERTIFICATE OF CORRECTION

PATENT NO. : 8,586,259 B2
APPLICATION NO. : 12/128610
DATED : November 19, 2013
INVENTOR(S) : Xiaobing Zhu, Zhen Zhou and Meilin Liu It is certified that error appears in the above-identified patent and that said Letters Patent is hereby corrected as shown below:

In the Specifications

In column 1, line 9, change "(PEMS)" to --(PEMs)--

In column 1, line 33, please delete "a" after "widely used as"

In column 2, line 49, change "the singular forms "a," "and," and" to --the singular forms "a", "and", and--

In column 3, line 16, change "1×10-3" to --$1 \times 10^{-3}$--

In column 3, line 63, change "whereby" to --wherein--

In column 4, lines 26-27, change "[—$O_b$—Si—($R^1$)$_b$($CH_2$)$_n$W)—]" to --[—$O_b$—Si—($R^1$)$_b$(($CH_2$)$_n$W)—]--

In column 4, line 33, change "[=($O_2$)Si—($R^1$)($CH_2$)$_n$W)—]" to --[—($O_2$)Si—($R^1$)(($CH_2$)$_n$W)—]--

In column 4, line 33, change "[=($O_3$)Si—($CH_2$)$_n$W)—]" to --[—($O_3$)Si—(($CH_2$)$_n$W)—]--

In column 5, line 49, change "to a organic/inorganic hybrid" to --to an organic/inorganic hybrid--

In column 6, line 51, change "by sol-gel process" to --by sol-gel processes--

In column 6, line 54, change "copolymer network former compound" to --copolymer network forming compound--

In column 6, line 56, change "backbone former compound" to --backbone forming compound--

Signed and Sealed this
Sixth Day of May, 2014

Michelle K. Lee
*Deputy Director of the United States Patent and Trademark Office*

CERTIFICATE OF CORRECTION (continued)
U.S. Pat. No. 8,586,259 B2

In column 6, line 66, change "polytetrafluorothene" to --polytetrafluoroethylene--

In column 7, line 59, change "e.g. 1,2,4-triazole-grafted polysiloxane 1H-1,2,4 triazole" to
--e.g. 1,2,4-triazole-grafted polysiloxane: 1H-1,2,4-triazole--

In column 8, lines 23-24, change "to obtain solution #1.1 g concentrated $H_3PO_4$" to
--to obtain solution #1. 1 g of concentrated $H_3PO_4$--

In column 10, lines 1-2, change "measured at 0CV" to --measured at OCV (open-circuit voltage)--

In the Claims

In column 10, line 53, claim 2, change "[—$O_b$—Si—$(R^1)_b(CH_2)_nW$)—]" to
--[—$O_b$—Si—$(R^1)_b((CH_2)_nW)$—]--

In column 10, lines 57-58, change "imidazole, 1H-1,2,3-triazole, 1H-1,2,4-triazole and
1 H-benzimidazole" to --imidazole, 1,2,3-triazole, 1,2,4-triazole, and benzimidazole--

In column 11, line 12, change "method" to --membrane--

In column 11, line 15, change "member" to --membrane--

In column 11, lines 33-35, change "wherein the heterocycle is imidazole, 1H-1,2,3-triazole,
1H-1,2,4-triazole and 1 H-benzimidazole"" to --wherein the heterocycle is selected from imidazole,
1,2,3-triazole, 1,2,4-triazole, and benzimidazole--

In column 11, line 24, change "porous film" to --porous support film--

In column 11, line 26, change "membrane" to --fuel cell--

In column 11, line 32, change "membrane" to --fuel cell--

In column 11, line 37, change "membrane" to --fuel cell--

In column 11, line 40, change "membrane" to --fuel cell--

In column 12, line 1, change "membrane" to --fuel cell--

In column 12, line 9, change "membrane" to --fuel cell--

In column 12, line 15, change "the layer" to --a layer--

CERTIFICATE OF CORRECTION (continued)
U.S. Pat. No. 8,586,259 B2

In column 12, line 20, change "polymerizing the at least one functionalized" to --polymerizing at least one functionalized--

In column 12, lines 28-29, change "imidazole, 1H-1,2,3-triazole, 1H-1,2,4-triazole and 1 H-benzimidazole" to --imidazole, 1,2,3-triazole, 1,2,4-triazole, and benzimidazole--